United States Patent
Tarusawa et al.

(10) Patent No.: US 8,387,936 B2
(45) Date of Patent: Mar. 5, 2013

(54) SLIDE LOCKING MECHANISM FOR SEAT

(75) Inventors: Makoto Tarusawa, Fuchu-cho (JP);
Yasuhito Domoto, Fuchu-cho (JP);
Hiroyuki Wakayama, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 557 days.

(21) Appl. No.: 12/571,704

(22) Filed: Oct. 1, 2009

(65) Prior Publication Data
US 2010/0102192 A1 Apr. 29, 2010

(30) Foreign Application Priority Data

Oct. 23, 2008 (JP) ................................. 2008-273325

(51) Int. Cl.
*F16M 13/00* (2006.01)
(52) U.S. Cl. ........................... 248/429; 248/424; 74/527
(58) Field of Classification Search .................. 248/424, 248/429, 430; 74/527; 296/65.03, 65.14
See application file for complete search history.

(56) References Cited

U.S. PATENT DOCUMENTS

| | | | |
|---|---|---|---|
| 4,189,957 A * | 2/1980 | Gedig et al. ..................... 74/535 |
| 5,234,189 A * | 8/1993 | Myers ............................. 248/429 |
| 5,596,910 A | 1/1997 | Bauer et al. |
| 5,782,138 A | 7/1998 | Groche |
| 5,816,110 A | 10/1998 | Schuler et al. |
| 6,231,022 B1 * | 5/2001 | Becker et al. ................. 248/429 |
| 6,322,036 B1 * | 11/2001 | Tame et al. .................... 248/429 |
| 7,661,646 B2 * | 2/2010 | Weber ............................ 248/429 |
| 2008/0163717 A1 | 7/2008 | Weber |
| 2011/0233370 A1 * | 9/2011 | Wakayama et al. ........... 248/429 |

FOREIGN PATENT DOCUMENTS

JP 10-500647 1/1998
WO 2005/021319 A2 3/2005

* cited by examiner

*Primary Examiner* — Gwendolyn Baxter
(74) *Attorney, Agent, or Firm* — Gerald E. Hespos; Michael J. Porco; Matthew T. Hespos

(57) ABSTRACT

Disclosed is a slide locking mechanism for a seat, which comprises at least five locking pieces, a plurality of first latch portions and a plurality of second latch portions. An opening width of a hole of each of the first latch portions in a longitudinal direction of a lower rail is equal to a width of each of the locking pieces in the longitudinal direction, and an opening width of a hole of each of the second latch portions in the longitudinal direction is greater than the opening width of each of the holes of the first latch portions. The first latch portions and the second latch portions are alternately arranged along the longitudinal direction.

4 Claims, 11 Drawing Sheets

SLIDE LOCKING MECHANISM FOR SEAT

BACKGROUND OF THE INVENTION

1. Field of the Invention

The present invention relates to a slide locking mechanism for a seat.

2. Description of the Related Art

Heretofore, there has been known a slide locking mechanism for a seat, such as an automobile seat. For example, the conventional slide locking mechanism has a locking member held by an upper rail which is fixed to a seat in such a manner that a longitudinal direction of the upper rail is oriented along a frontward-rearward direction of an automobile body. Further, the slide locking mechanism has a plurality of latch portions having the same configurations, the latch portions are provided in a bottom wall of a lower rail fixed to the automobile body, and arranged in one line along the longitudinal direction. Each of the latch portions has a hole formed to allow the locking member to be releasably inserted thereinto. The locking member is formed such that a width thereof in the longitudinal direction is equal to an opening width of each of the holes of the latch portions in the longitudinal direction.

In the slide locking mechanism, when a seated person moves the seat to a target position in the frontward-rearward direction, the locking member is inserted into the hole of one of the latch portions which is located at a position (appropriate position) corresponding to the target position, according to a biasing force of biasing means, to establish a locked state where the inserted locking member is latched by the corresponding latch portion, so that the upper rail and the lower rail are locked together. This allows the seat to be fixed with respect to the automobile body.

However, when the seated person moves the seat to a target position in the frontward-rearward direction, the slide locking mechanism is likely to fall into an undesirable situation where the locking member is not aligned with any one of the latch portions, so that the locking member is brought into contact with a portion between adjacent ones of the latch portions and precluded from being inserted into the hole of any one of the latch portions. In this situation, for example, if the seat is pushed in the frontward or rearward direction by the seated person, the locking member is liable to be quickly moved in the frontward or rearward direction before it is inserted into the latch portion adjacent to the appropriate position, so that the locking member passes over the appropriate position in the bottom wall of the lower rail.

In this case, as the opening width of each of the holes of the latch portions is gradually increased relative to the width of the locking member, the locking member becomes more easily insertable into the hole of one of the latch portions. However, this approach leads to the occurrence of a play (free gap in the longitudinal direction) between the inserted locking member and the corresponding latch portion, which causes a wobbling movement of the seat in the locked state to preclude the seat from being fixed.

Therefore, a locking mechanism has been proposed which is designed to allow a locking member to be easily inserted into a hole of one of a plurality of latch portions, while preventing the occurrence of a play between the inserted locking member and an corresponding one of the latch portions, as disclosed, for example, in JP 10-500647A. In the locking mechanism disclosed in the JP 10-500647A, the locking member is comprised of a plurality of locking bolts each formed to be insertable into the hole (detent opening) of each of the latch portions, wherein the locking bolts are arranged in one line in a frontward-rearward direction of a vehicle at regular intervals. Each of the locking bolts is provided to be rotatable about an axis thereof by rotation means. When two of the locking bolts are inserted into respective ones of two of the latch portions, each of the locking bolts is rotated about the axis by the rotation means. According to the rotation, one of the two locking bolts inserted into respective ones of the two latch portions is brought into contact with a front inner wall region of one of the two latch portions, and the other locking bolt is brought into contact with a rear inner wall region of the other latch portion. Thus, in the locked state, a play in both the frontward and rearward directions is eliminated to prevent a wobbling movement of a seat (see FIG. 6 in the JP 10-500647A).

However, in the locking mechanism disclosed in the JP 10-500647A, it is necessary to provide the rotation means to each of the locking bolts in order to rotate the locking bolt about the axis, which leads to structural complexity and an increase in cost.

Moreover, in the locking mechanism disclosed in the JP 10-500647A, when an upper rail is urged to be moved in the frontward or rearward direction relative to a lower rail in the locked state, a force applied to the upper rail at the time is imposed on one of the two locking bolts inserted into respective ones of the holes of the two latch portions. Thus, the force is concentrically imposed on the inserted locking bolt, and the front or rear inner wall region of an corresponding one of the two latch portions. Therefore, in order to prevent fracture of the inserted locking bolt and damage in the front or rear inner wall region of the corresponding latch portion in such a situation, strength of each of the locking bolts and the lower rail has to be increased, which causes a problem of an increase in cost.

SUMMARY OF THE INVENTION

It is an object of the present invention to provide a slide locking mechanism for a seat, which is capable of reducing a play between a locking member and a corresponding one of a plurality of latch portions in a locked state, with a simple structure.

It is another object of the present invention to provide a slide locking mechanism for a seat, which is less likely to cause a force to concentrate on the locking member and the corresponding latch portion.

The present invention provides a slide locking mechanism for a seat, which comprises: a locking member held by one of an elongate-shaped lower rail fixed to a vehicle body, and an elongate-shaped upper rail fixed to the seat; and a plurality of latch portions provided in a remaining one of the lower rail and the upper rail and arranged along a longitudinal direction thereof to latch the locking member. The locking member has at least five locking pieces arranged along the longitudinal direction. Each of the at least five locking pieces has a same width in the longitudinal direction. The latch portions include two or more first latch portions each having a hole formed such that an opening width thereof in the longitudinal direction is equal to the width of each of the locking pieces, and two or more second latch portions each having a hole formed such that an opening width thereof in the longitudinal direction is greater than the opening width of each of the holes of the first latch portions. The first latch portions and the second latch portions are alternately arranged along the longitudinal direction. Each of the holes of the first and second latch portions is formed to allow a respective one of the locking pieces to be releasably inserted thereinto. The opening width of each of the holes of the second latch portions has a dimension allowing at least two of the locking pieces to be inserted thereinto.

DETAILED DESCRIPTION OF THE PREFERRED EMBODIMENTS

Figure 1:
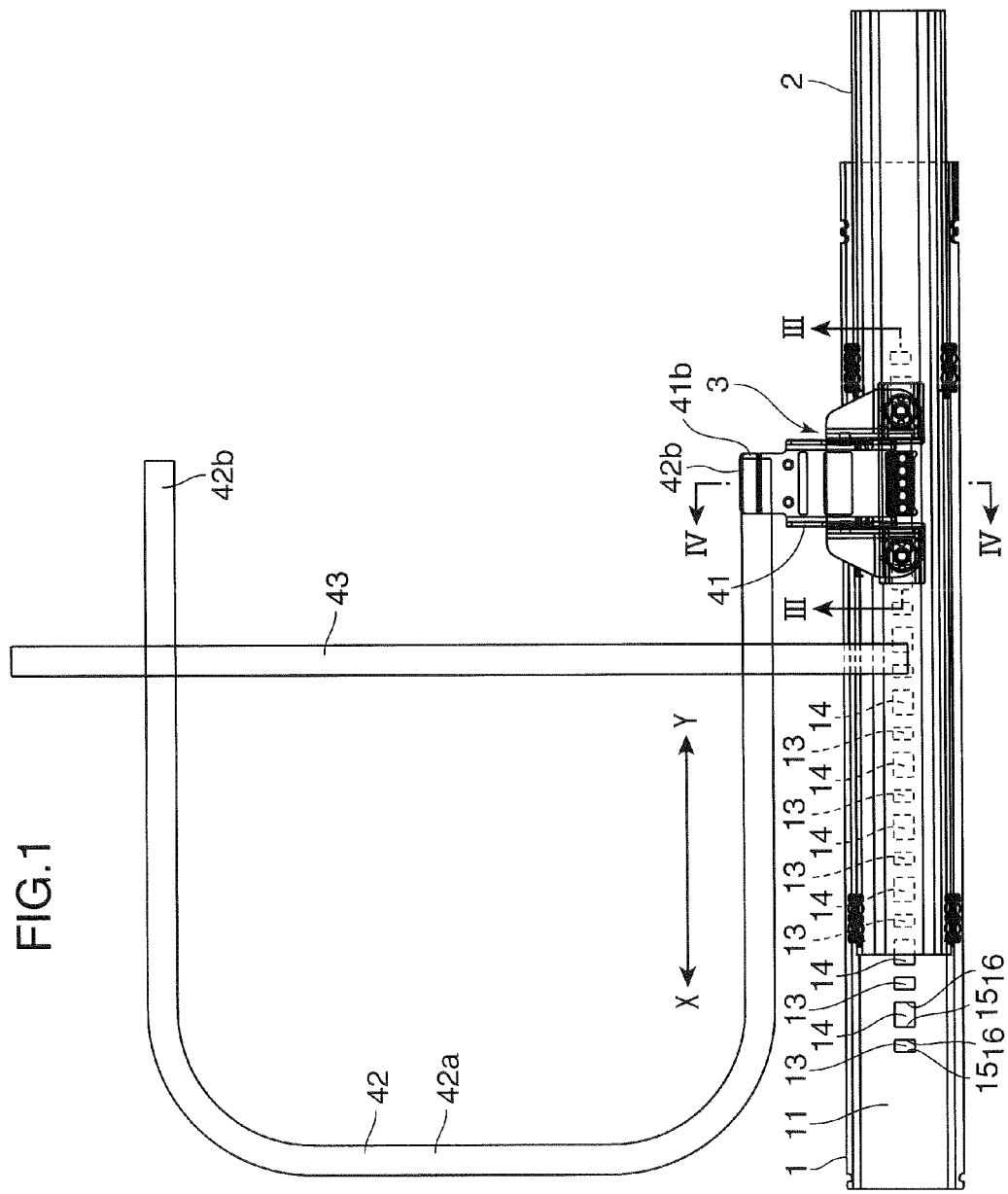
FIG. 1 is a schematic top plan view showing a seat sliding apparatus for an automobile, which has a slide locking mechanism according to one embodiment of the present invention.
Figure 2:
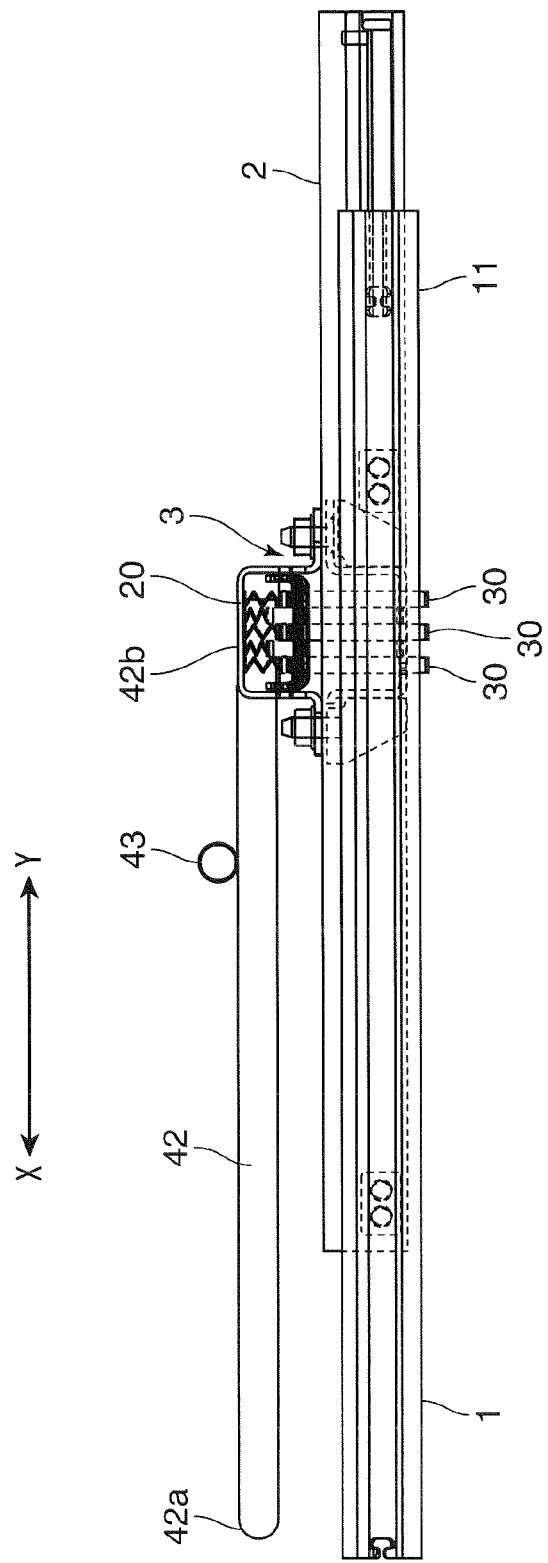
FIG. 2 is a schematic side view showing the seat sliding apparatus in FIG. 1.
Figure 3:
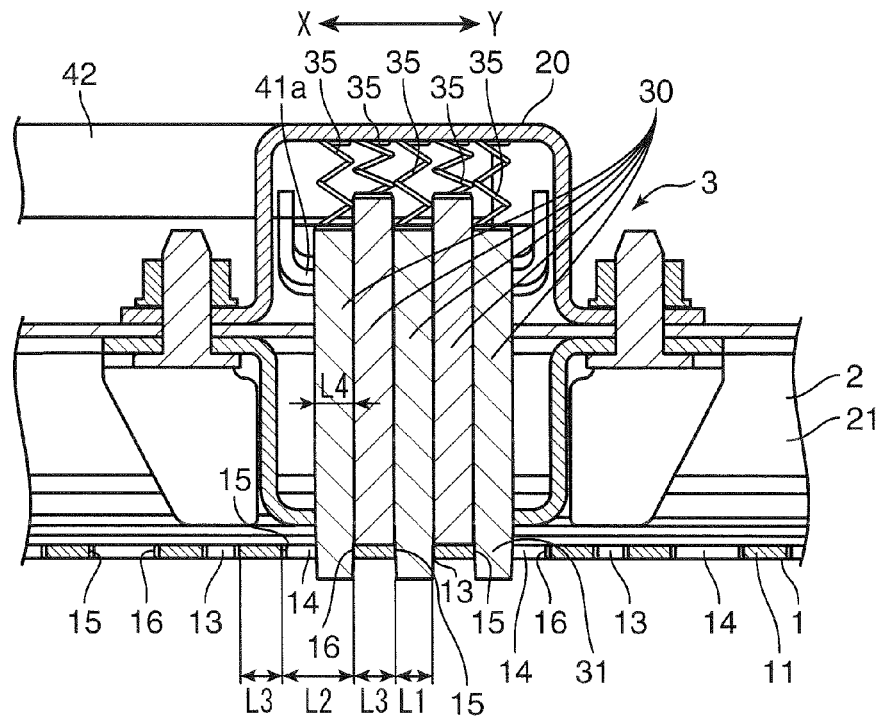
FIG. 3 is an enlarged sectional view taken along the line III-III in FIG. 1.
Figure 4:
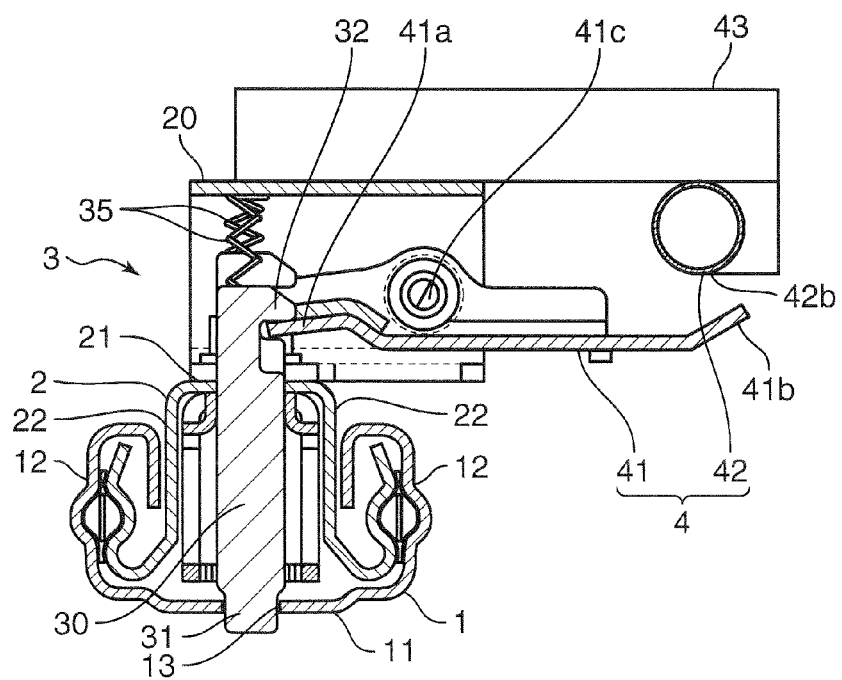
FIG. 4 is an enlarged sectional view taken along the line IV-IV in FIG. 1.

With reference to the drawings, the present invention will now be specifically described based on an embodiment thereof. FIG. 1 is a schematic top plan view showing a seat sliding apparatus for an automobile, which has a slide locking mechanism according to one embodiment of the present invention. FIG. 2 is a side view of the seat sliding apparatus in FIG. 1. FIG. 3 is an enlarged sectional view taken along the line III-III in FIG. 1. FIG. 4 is an enlarged sectional view taken along the line IV-IV in FIG. 1.

As shown in FIGS. 1 and 2, the automobile seat sliding apparatus in this embodiment comprises a lower rail 1, an upper rail 2, and a slide locking mechanism 3.

The lower rail 1 is an elongate-shape member. As shown in FIG. 4, the lower rail 1 has a bottom wall 11, and two right and left lateral walls 12, 12 formed to extend bendingly and upwardly from respective widthwisely opposite ends of the bottom wall 11. As shown in FIG. 1, the bottom wall 11 has a plurality of latch portions arranged in one line in a longitudinal direction of the lower rail 1.

The latch portions are comprised of two or more first latch portions 13 and two or more second latch portions 14. The first latch portions 13 and the second latch portions 14 are alternately arranged along the longitudinal direction of the lower rail 1. Each of the first latch portions 13 has a hole penetrating from an upper surface to a lower surface of the bottom wall 11. Each of the second latch portions 14 has a hole penetrating from an upper surface to a lower surface of the bottom wall 11. The hole of each of the first latch portions 13 and the hole of each of the second latch portions 14 are different in opening width in the longitudinal direction.

Each of the holes of the first and second latch portions 13, 14 includes a peripheral edge defining an upper opening in the upper surface of the bottom wall 11 of the lower rail 1, a peripheral edge defining a lower opening in the lower surface of the bottom wall 11 of the lower rail 1, and an inner wall extending between the two peripheral edges in a thicknesswise direction of the bottom wall 11.

As shown in FIG. 3, each of the holes of the second latch portions 14 is formed such that an opening width (length) L2 thereof in the longitudinal direction is two times greater than an opening width (length) L1 of each of the holes of the first latch portions 13 in the longitudinal direction. A distance L3 between adjacent ones of the first and second latch portions 13, 14 is equal to the opening width L1 of each of the holes of the first latch portions 13. The opening width L1 of each of the holes of the first latch portions 13 is equal to a width L4 of an after-mentioned locking piece 30.

As used herein, the term "two times" includes "exactly two times" and "approximately two times". Further, as used herein, the term "equal" includes "exactly equal", and "approximately equal". Further, as used herein, the term "the same" includes "exactly the same" and "approximately the same". Further, as used herein, the term "without a gap" or "without forming a gap" includes not only a state in which the adjacent ones of the locking pieces 30 are in contact with each other without any gap, but also a state in which a slight gap is formed between the adjacent ones of the locking pieces 30. Further, as used herein, the term "in contact with" includes "in point contact with", "in line contact with", "in surface contact with", and "in almost contact with each other with a slight gap".

A front inner wall region 15 of each of the holes of the first and second latch portions 13, 14, i.e., a front region of the inner wall of each of the holes of the first and second latch portions 13, 14 in the longitudinal direction, serves as a front lock wall adapted to be brought into contact with the aftermentioned locking piece 30 of the slide locking mechanism when the locking piece 30 is inserted into the hole, and urged to be moved in a frontward direction (direction X in FIGS. 1 to 3). Further, a rear inner wall region 16 of each of the holes of the first and second latch portions 13, 14, i.e., a rear region of the inner wall of each of the holes of the first and second latch portions 13, 14 in the longitudinal direction, serves as a rear lock wall adapted to be brought into contact with the locking piece 30 when the locking piece 30 is inserted into the hole, and urged to be moved in a rearward direction (direction Y in FIGS. 1 to 3).

The lower rail 1 formed in the above manner is fixed to a floor of an automobile body in such a manner that the longitudinal direction thereof is oriented along a frontward-rearward direction of the automobile body (direction X-Y in FIGS. 1 to 3). The first latch portions 13 and the second latch portions 14 are alternately arranged along the longitudinal direction of the lower rail 1.

The upper rail 2 is an elongate-shaped member having a length approximately equal to that of the lower rail 1. As shown in FIG. 4, the upper rail 2 has a top wall 21, and two right and left lateral walls 22, 22 formed to extend bendingly and downwardly from respective widthwisely (rightward-leftward direction in FIG. 4) opposite ends of the top wall 21.

The upper rail 2 is fixed to a seat (not shown) of the automobile. The right and left lateral walls 22, 22 of the upper rail 2 are received between the right and left lateral walls 12, 12 of the lower rail 1 to allow the upper rail 2 to be slidably moved along the longitudinal direction of the lower rail 1. According to the slide movement of the upper rail 2 on the lower rail 1, the automobile seat is moved in the frontward-rearward direction.

The slide locking mechanism 3 is intended to lock the slide movement of the upper rail 2 with respect to the lower rail 1. In this embodiment, the slide locking mechanism 3 comprises the latch portions 13, 14, five locking pieces 30 constituting a locking member, five bias members 35 each biasing a respective one of the locking pieces 30, and a lock release member 4 adapted to release a state in which one or more of the locking pieces 30 are latched by corresponding ones of the latch portions 13, 14.

Each of the five locking pieces 30 has the same configuration. In this embodiment, each of the locking pieces 30 is a generally rectangular parallelepiped-shaped member, and arranged such that a lengthwise direction thereof is oriented along a vertical direction. Each of the locking pieces 30 has a lower distal end serving as an insertion portion 31 adapted to be inserted into one of the latch portions 13, 14. In this embodiment, the insertion portion 31 is formed in a taper shape having a width in the longitudinal direction (the frontward-rearward direction) which gradually decreases toward a lower edge thereof. Each of the five locking pieces 30 has the same width L4 in the longitudinal direction.

Figure 6:
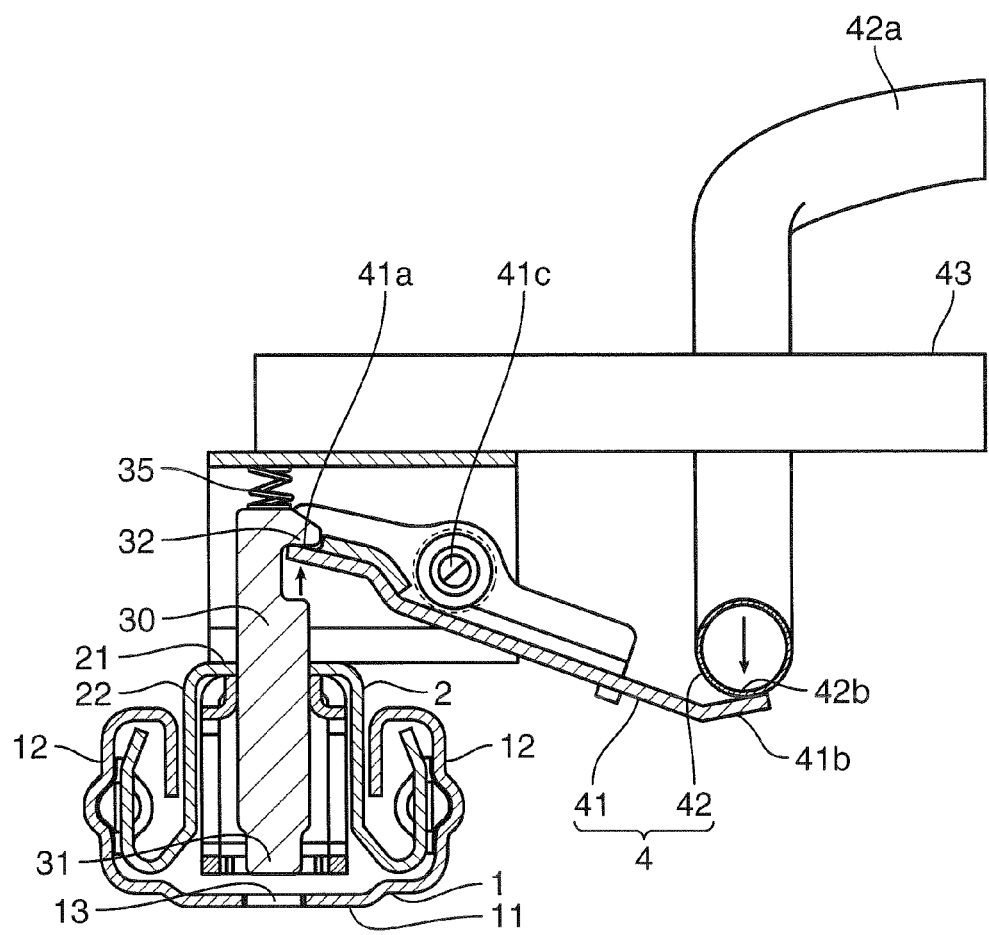
FIG. 6 is a fragmentary enlarged transverse sectional view showing the unlocked state.

As shown in FIGS. 4 and 6, each of the locking pieces 30 has an upper base end formed with a protrusion 32 protruding in a lateral direction.

As shown in FIG. 3, the five locking pieces 30 each formed in the above manner are arranged side-by-side in the longitudinal direction of the upper rail 2 (direction corresponding to the frontward-rearward direction of the automobile). Specifically, adjacent ones of the locking pieces 30 are arranged such that a front surface of a rear one of the adjacent two locking pieces 30 is in contact with a rear surface of a front one of the locking pieces 30. The insertion portion 31 of each of the locking pieces 30 is disposed just above the bottom wall 11 of the lower rail 1 in such a manner as to be insertable into one of the latch portions 13, 14. Further, each of the locking pieces 30 is held by the upper rail 2 in a vertically movable manner.

In this embodiment, each of the bias members 35 is comprised of a coil spring. Each of the bias members 35 constantly biases a corresponding one of the locking pieces 30 toward the bottom wall 11 of the lower rail 1 located just below the locking pieces 30. This allows the insertion portion 31 of each of the locking pieces 30 to be biasedly inserted into one of the latch portions 13, 14 of the lower rail 1.

As shown in FIGS. 1 and 4, the lock release member 4 comprises a locking-piece lifting member 41, and an operation member 42 adapted to operate the locking-piece lifting member 41. The locking-piece lifting member 41 has one end formed as a protrusion catch portion 41a engageable with the respective protrusions 32 of the locking pieces 30, and the other end formed as a pushable portion 41b adapted to be pushed by the operation member 42. The lock release member 4 moves the locking pieces 30 from the latch position as shown in FIG. 4 to the release position as shown in FIG. 6.

The protrusion catch portion 41a is formed such that a width thereof in the longitudinal direction of the upper rail 2 (in the frontward-rearward direction) is greater than a total width of the five locking pieces 30 in the longitudinal direction of the upper rail 2. The protrusion catch portion 41a is disposed just below the respective protrusions 32 of the locking pieces 30

The locking-piece lifting member 41 has a pivot portion 41c which is provided between the protrusion catch portion 41a and the pushable portion 41b, and rotatably supported by a support member 20 attached to the upper rail 2. Thus, when the pushable portion 41b is pushed downwardly, the locking-piece lifting member 41 is rotated about the pivot portion 41c, so that the protrusion catch portion 41a is moved upwardly. During a course of the upward movement, the protrusion catch portion 41a is engaged with the respective protrusions 32 of the locking pieces 30 to lift the locking pieces 30 upwardly.

In this embodiment, as shown in FIGS. 1 and 2, the operation member 42 is a member formed by bending a round bar into a generally U shape. The operation member 42 has a front end formed as a grip portion 42a, and two rear ends each formed as a pushing portion 42b adapted to push the pushable portion 41b of the locking-piece lifting member 41.

Specifically, FIG. 4 shows a left one of the pushing portions 42b of the operation member 42. Although not illustrated in FIG. 1, the same structure as that comprising the lower rail 1, the upper rail 2 and the slide locking mechanism 3 each disposed on a left side of the operation member 42 is also disposed on a right side of the operation member 42 in a bilaterally paired manner. Thus, a right one of the ends of the operation member 42 serves as a pushing portion adapted to a pushable portion in a slide locking mechanism disposed on the right side.

The grip portion 42a is disposed just below a front end of the seat (not shown). A seated person seated in the seat can grip the grip portion 42a in a seated posture. As shown in FIG. 4, the pushing portion 42b is disposed just above the pushable portion 41b.

In this embodiment, the operation member 42 is disposed to be swingable about a shaft 43. The shaft 43 is rotatably held by the seat. The operation member 42 is fixed to the shaft 43 through an intermediate portion thereof located between the grip portion 42a and each of the pushing portions 42b.

When the grip portion 42a is lifted upwardly by the seated person, the pushing portion 42b is moved downwardly to push the pushable portion 41b downwardly. In this embodiment, the shaft 43 is biased by a spring member (not shown). Thus, when a hand of the seated person is released from the grip portion 42a after the seated person manually lifts the grip portion 42a upwardly, the grip portion 42a is returned to its original position in FIGS. 1 and 2 by the spring member.

An operation of the slide locking mechanism according to this embodiment will be described below. When the operation member 42 is manually operated by a seated person, the pushable portion 41b of the locking-piece lifting member 41 is pushed downwardly.

Figure 5:
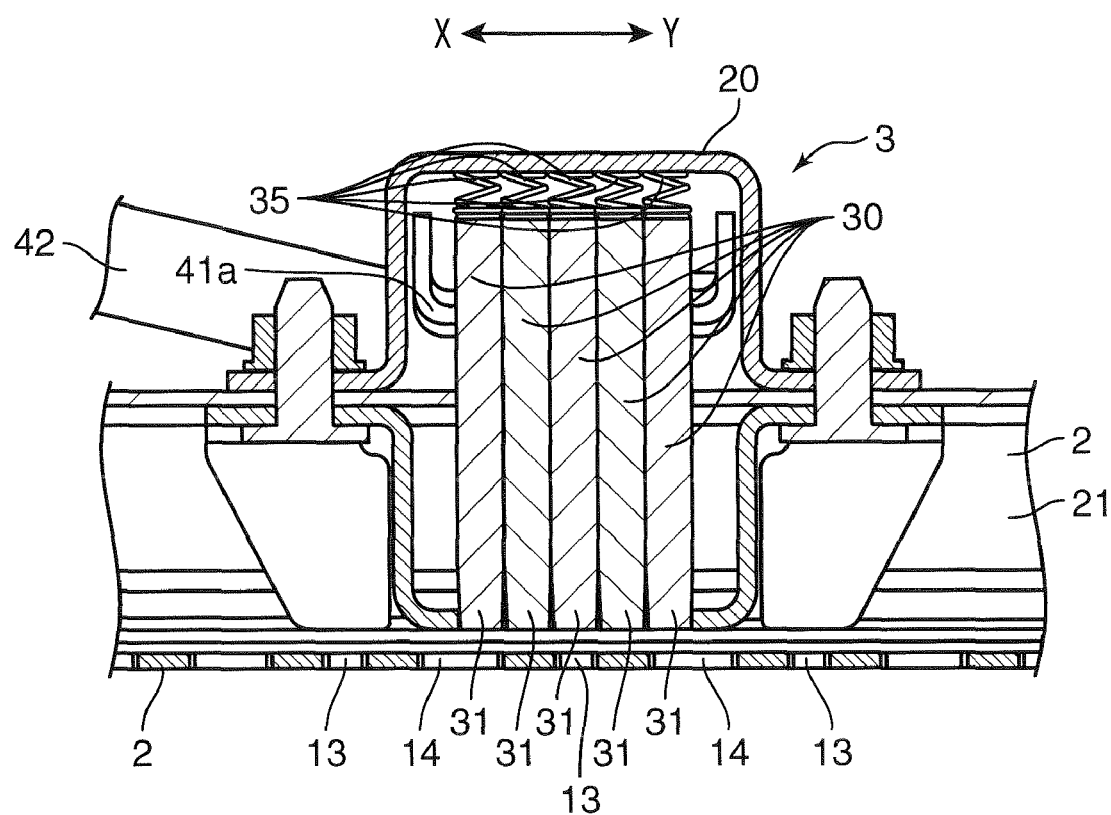
FIG. 5 is a fragmentary enlarged longitudinal sectional view showing an unlocked state.

According to the manual operation, as shown in FIGS. 5 and 6, the protrusion catch portion 41a of the locking-piece lifting member 41 is engaged with all of the protrusions 32 of the locking pieces 30 to lift all of the locking pieces 30 upwardly against a biasing force of the coil springs 35. In this state, all of the insertion portions 31 of the locking pieces 30 are pulled out from the latch portions 13, 14.

In this state, the upper rail 2 is slidable relative to the lower rail 1. Thus, for example, when the seat is pushed in the frontward or rearward direction by the seated person, the upper rail 1 is slidably moved in the frontward or rearward direction relative to the lower rail 1, and the seat is moved accordingly.

When a hand of the seated person is released from the operation member 42 after the seat is adjusted to an appropriate position in the frontward-rearward direction by the seated person, the operation member 42 is returned to the original position, and the locking pieces 30 are biasedly moved downwardly by the bias members 35.

Figure 18:
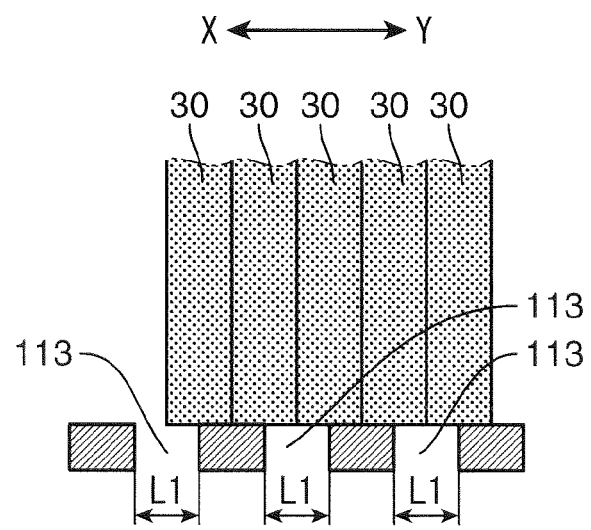
FIG. 18 is a schematic view showing a comparative example.

For example, as shown in FIG. 18, if each hole of five latch portions 113 is formed such that a width L1 thereof in the frontward-rearward direction (longitudinal direction of the lower rail 1) is equal to the width of each of the locking pieces 30 in the frontward-rearward direction, it is likely that all of the locking pieces 30 are not inserted into any of a plurality of latch portions 113 during the above downward movement, due to misalignment between respective positions of the locking pieces 30 and the latch portions 113 in the frontward-rearward direction.

In the above situation, for example, if the seat is pushed in the frontward or rearward direction by the seated person, the locking pieces 30 are liable to be quickly moved in the frontward or rearward direction before they are inserted into ones the latch portions 113, so that the locking pieces 30 slip over the bottom wall 11 of the lower rail 1.

In this case, as a width of each of the latch portions 113 in the frontward-rearward direction is gradually increased relative to the width of each of the locking pieces 30 in the frontward-rearward direction, one of the locking pieces 30 becomes more likely to be aligned with one of the latch portions 113, in the frontward-rearward direction, so that the locking piece 30 can be more easily inserted into the latch portion 113. However, this approach leads to the occurrence of a play (free gap in the frontward-rearward direction) between the inserted locking piece 30 and the corresponding latch portion 113, which causes a wobbling movement of the seat in the locked state to preclude the seat from being fixed.

In this embodiment, the first latch portions 13 each having the hole with the opening width L1 which is equal to the width L4 of each of the locking pieces 30, and the second latch portions 14 each having the hole with the opening width L2 which is two times greater than the width L4 of each of the locking pieces 30, are alternately arranged in the longitudinal direction. Thus, regardless of a position of the upper rail 2 in the frontward-rearward direction relative to the lower rail 1, one of the locking pieces 30 is aligned with one of the second latch portions 14 in the frontward-rearward direction, and inserted into the hole of the second latch portion 14. Specifically, the locking member (the group of locking pieces 30) is located in one of the following positions with respect to the first and second latch portions 13, 14.

Firstly, the locking member can be located in a position where one of the locking pieces 30 is aligned with and inserted into one of the second latch portions 14 (FIGS. 7, 10, 12, 14 and 16).

Secondly, the locking member can be located in a position where adjacent two of the locking pieces 30 are aligned with and inserted into one of the second latch portions 14, and one of the remaining locking pieces 30 are aligned with and inserted into one of the first latch portions 13 (FIGS. 8, 11, 13, 15 and 17).

Figure 9:
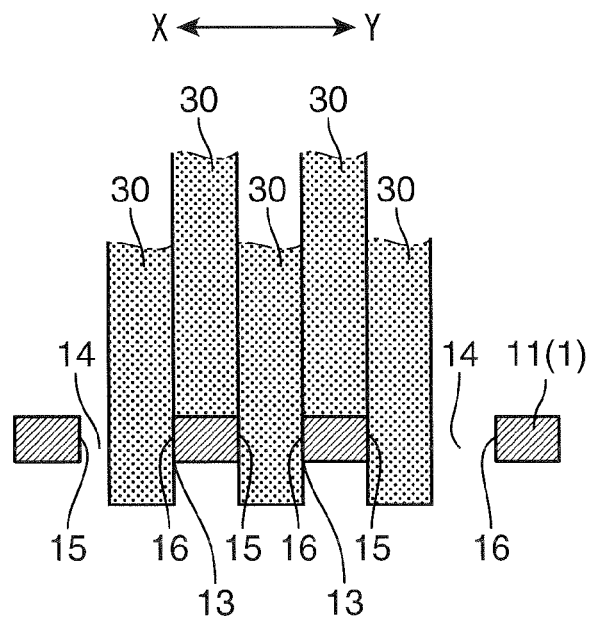
FIG. 9 is a schematic view showing a state after the seat is moved in a rearward direction of the automobile body from the position in FIG. 7, wherein one of the locking pieces is inserted into one of the first latch portions, and two of the remaining locking pieces are inserted into respective ones of the two second latch portions located on front and rear sides of the corresponding first latch portion.

Thirdly, the locking member can be located in a position where a middle one of the locking pieces 30 in the frontward-rearward direction is aligned with and inserted into one of the first latch portions 13, and two of the remaining locking pieces 30 are aligned with and inserted into respective ones of the two second latch portions 14 on front and rear side of the corresponding first latch portion 13 (FIG. 9).

As above, in this embodiment, even if the locking member is located at any position of the bottom wall 11, at least one of the locking pieces 30 can be aligned with and inserted into one of the first and second portions 13, 14. Thus, for example, even if the seat is strongly pushed in the frontward or rearward direction by the seated person, the at least one locking piece 30 inserted into one of the first and second portions 13, 14 can be brought into contact with the front inner wall region 15 or the rear inner wall region 16 of the corresponding one of the first and second portions 13, 14. This makes it possible to suppress the undesirable situation where all of the locking pieces 30 pass over an appropriate position of the bottom wall 11 of the lower rail 1.

Further, among the above positions, in the position where adjacent two of the locking pieces 30 are inserted into one of the second latch portions 14 as illustrated in FIGS. 8, 11, 13, 15 and 17, and in the position where a middle one of the locking pieces 30 in the frontward-rearward direction is inserted into one of the first latch portions 13 as illustrated in FIG. 9, a play between the inserted locking piece(s) 30 and the corresponding latch portion (13 or 14) is almost eliminated. On the other hand, in the position where one of the locking pieces 30 is inserted into one of the second latch portions 14 as illustrated in FIGS. 7, 10, 12, 14 and 16, a play exists between the inserted locking piece 30 and the corresponding second latch portion 14.

Figure 7:
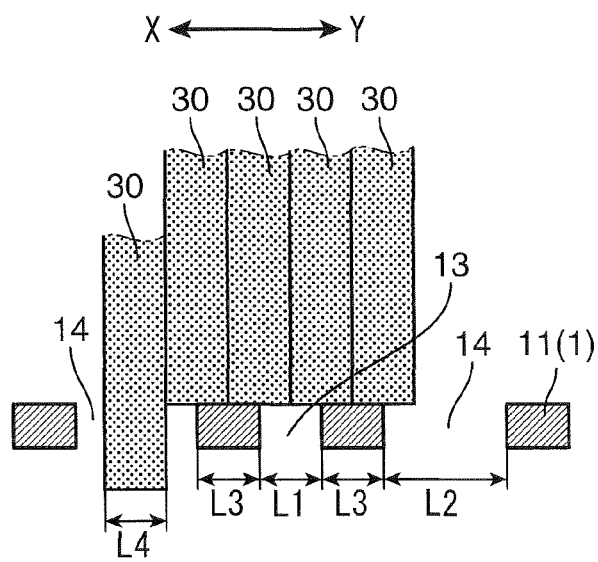
FIG. 7 is a schematic view showing a state when a frontwardmost one of five locking pieces is inserted into one of a plurality of second latch portions.
Figure 8:
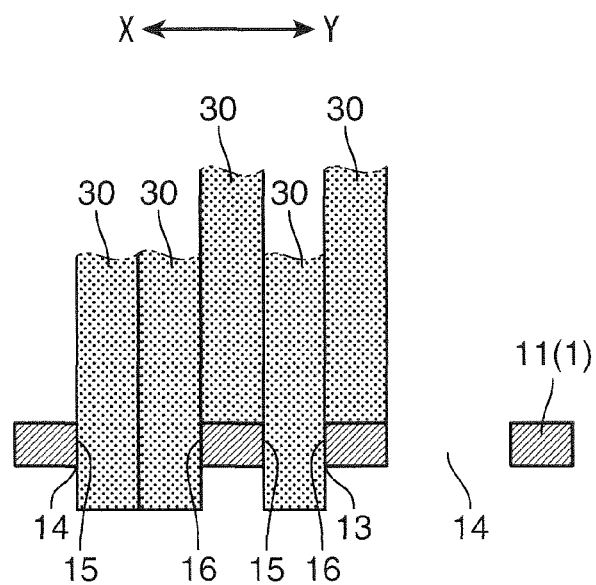
FIG. 8 is a schematic view showing a state after the seat is moved in a frontward direction of an automobile body from a position in FIG. 7, wherein two of the locking pieces are inserted into one of the second latch portions, and one of the remaining locking pieces is inserted into one of a plurality of first latch portions.

However, in the case where the locking member is located in the position illustrated in FIG. 7, the locking pieces 30 may be moved in the frontward direction (direction X) from the position illustrated in FIG. 7 by moving the seat in the frontward direction. As a result, the locking piece 30 adjacent to the inserted locking piece 30 is additionally aligned with and inserted into the corresponding second latch portion 14, and one of the remaining locking pieces 30 is aligned with and inserted into one of the first latch portions 13, as illustrated in FIG. 8.

Alternatively, the locking pieces 30 may be moved in the rearward direction (direction Y) from the position illustrated in FIG. 7 by moving the seat in the rearward direction. As a result, the middle one of the locking pieces 30 in the frontward-rearward direction is aligned with and inserted into one of the first latch portions 13, and, in addition to the inserted locking piece 30 in the corresponding second latch portion 14, one of the remaining locking pieces 30 is aligned with and inserted with the second latch portion 14 on a rear side of the corresponding first latch portion 13, as illustrated in FIG. 9.

Figure 11:
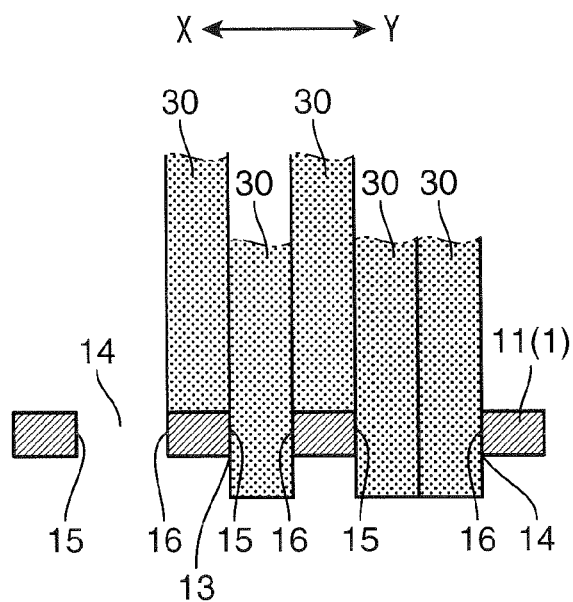
FIG. 11 is a schematic view showing a state after the seat is moved in the rearward direction from a position in FIG. 10, wherein two of the locking pieces are inserted into one of the second latch portions, and one of the remaining locking pieces is inserted into one of the first latch portions.
Figure 12:
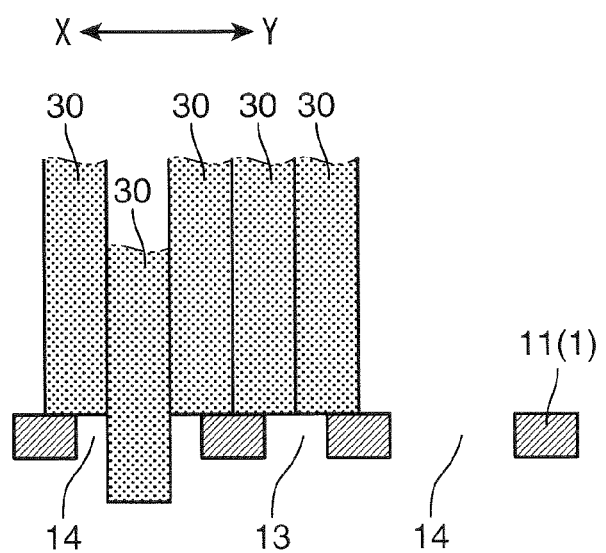
FIG. 12 is a schematic view showing a state when a secondmost frontward one of the locking pieces is inserted into one of the second latch portions.
Figure 13:
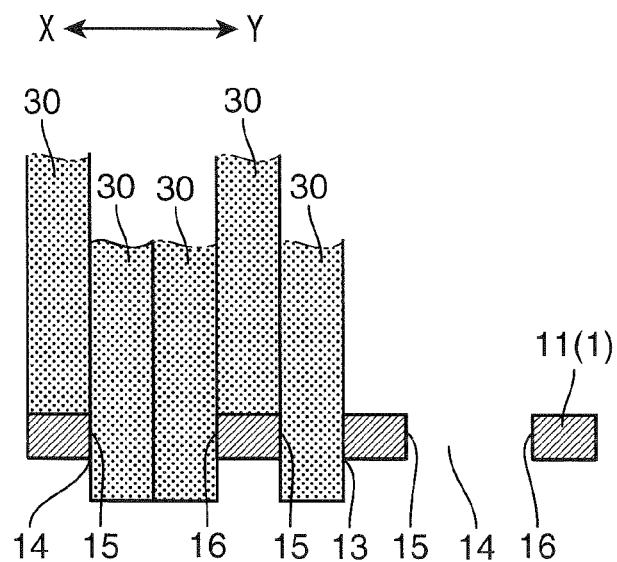
FIG. 13 is a schematic view showing a state after the seat is moved in the frontward direction from a position in FIG. 12, wherein two of the locking pieces is inserted into one of the second latch portions, and one of the remaining locking pieces is inserted into one of the first latch portions.
Figure 14:
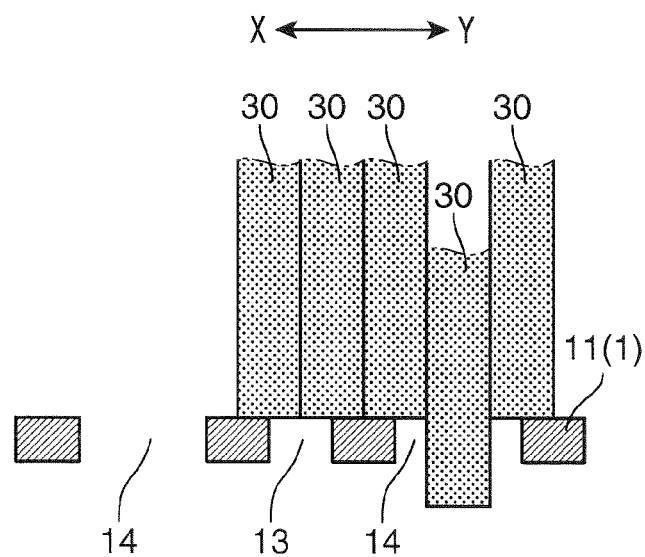
FIG. 14 is a schematic view showing a state when a secondmost rearward one of the locking pieces is inserted into one of the second latch portions.
Figure 16:
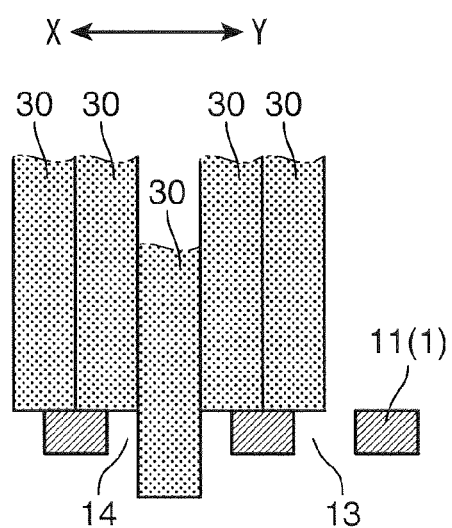
FIG. 16 is a schematic view showing a state when a middle one of the locking pieces in the frontward-rearward direction is inserted into one of the second latch portions.
Figure 17:
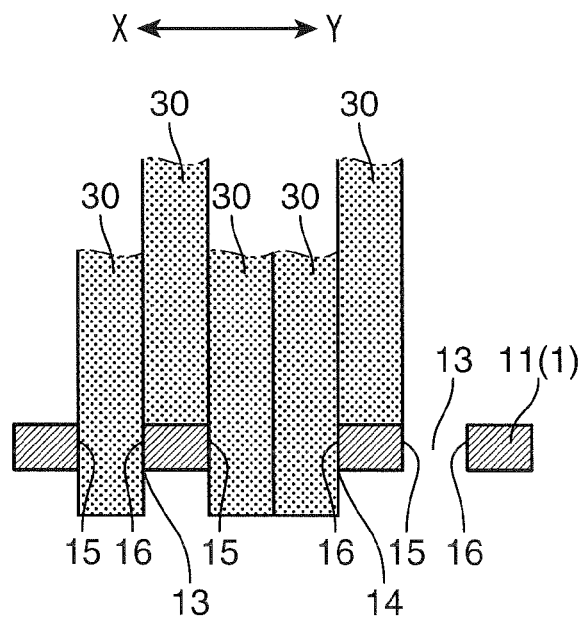
FIG. 17 is a schematic view showing a state after the seat is moved in the frontward direction from a position in FIG. 16, wherein two of the locking pieces is inserted into one of the second latch portion, and one of the remaining locking pieces is inserted into one of the first latch portions.

In the case where the locking member is located in the position illustrated in FIG. 12, FIG. 14 or FIG. 16, the locking pieces 30 may be moved in the frontward direction from the position illustrated in FIG. 12, FIG. 14 or FIG. 16. As a result, the locking piece 30 adjacent to the inserted locking piece 30 is additionally aligned with and inserted into the corresponding second latch portion 14, and one of the remaining locking pieces 30 is aligned with and inserted into one of the first latch portions 13, as illustrated in FIG. 13, FIG. 11 or FIG. 17.

Figure 15:
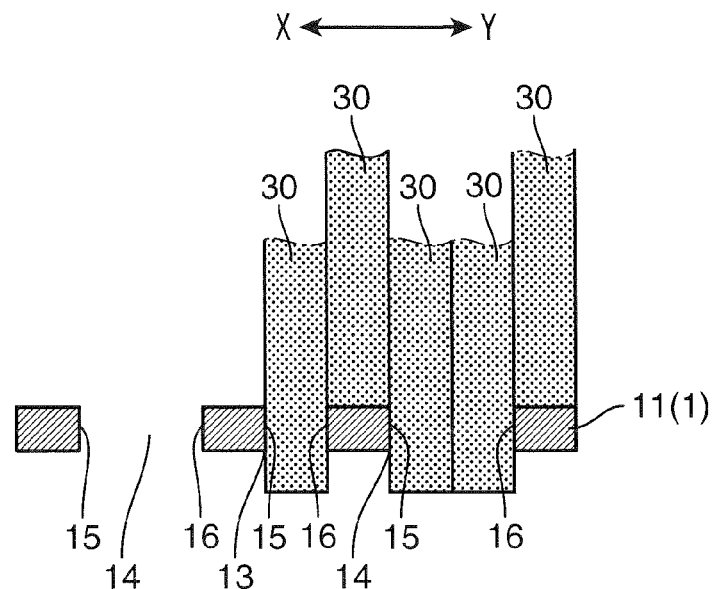
FIG. 15 is a schematic view showing a state after the seat is moved in the rearward direction from a position in FIG. 14, wherein two of the locking pieces is inserted into one of the second latch portion, and one of the remaining locking pieces is inserted into one of the first latch portions.

Alternatively, the locking pieces 30 may be moved in the rearward direction from the position illustrated in FIG. 12, FIG. 14 or FIG. 16. As a result, the locking piece 30 adjacent to the inserted locking piece 30 is additionally aligned with and inserted into the corresponding second latch portion 14, and one of the remaining locking pieces 30 is aligned with and inserted into one of the first latch portions 13, as illustrated in FIG. 8, FIG. 15 or FIG. 11.

Figure 10:
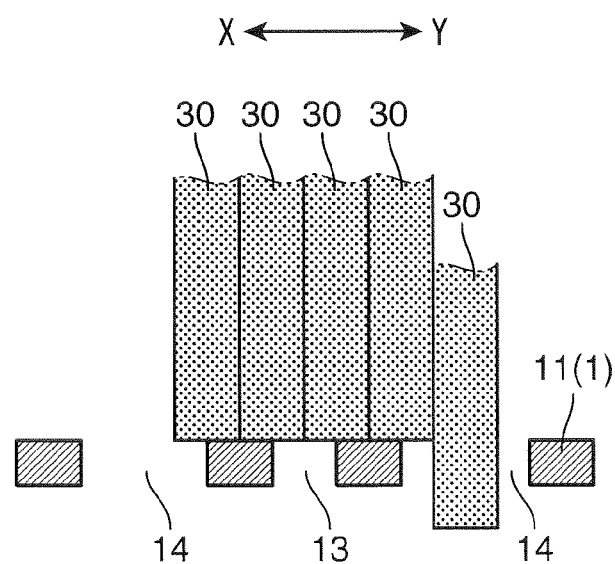
FIG. 10 is a schematic view showing a state when a rearwardmost one of the locking pieces is inserted into one of the second latch portions.

In the case where the locking member is located in the position illustrated in FIG. 10, the locking pieces 30 may be moved in the frontward direction from the position illustrated in FIG. 10. As a result, the middle one of the locking pieces 30 in the frontward-rearward direction is aligned with and inserted into one of the first latch portions 13, and, in addition to the inserted locking piece 30 in the corresponding second latch portion 14, one of the remaining locking pieces 30 is aligned with and inserted with the second latch portion 14 on a front side of the corresponding first latch portion 13, as illustrated in FIG. 9.

Alternatively, the locking pieces 30 may be moved in the rearward direction from the position illustrated in FIG. 10. As a result, the locking piece 30 adjacent to the inserted locking piece 30 is additionally aligned with and inserted into the corresponding second latch portion 14, and one of the remaining locking pieces 30 is aligned with and inserted into one of the first latch portions 13, as illustrated in FIG. 11.

Thus, the play created between the inserted locking piece 30 and the corresponding second latch portion 14 can be eliminated by slightly moving the seat. In this manner, the upper rail 2 is locked to the lower rail 1 to allow the seat to be fixed.

In each of the locked state illustrated in FIGS. 8, 9, 11, 13, 15 and 17, one of the inserted locking pieces 30 is in contact with the front and rear inner wall regions 15, 16 of the hole of an corresponding one of the first latch portions 13, and the remaining two locking pieces 30 are in contact of respective ones of the front and rear inner wall regions 15, 16 of the hole of an corresponding one of the second latch portions, or in contact of respective ones of the front inner wall region 15 of the hole of an corresponding one of the second latch portions and a rear inner wall region 16 of the hole of an corresponding one of the remaining second latch portions. Thus, a force imposed on the upper rail 2 during the frontward or rearward movement of the seat can be distributed to and received by two positions, in the above manner. The state in which a force is distributed to two positions means that two of the locking pieces 30 are in contact with respective ones of the different two front inner wall regions 15, and two of the locking pieces 30 are in contact with respective ones of the different two rear inner wall regions 16.

Further, in this embodiment, the five locking pieces 30 are arranged such that adjacent ones thereof are in contact with each other, so that a force which may otherwise be imposed on a part of the locking pieces 30 can be received by all of the five locking pieces 30, to provide enhanced strength of the locking pieces 30. Thus, even if the width of each of the locking pieces 30 in the longitudinal direction is reduced, sufficient strength can be maintained. This makes it possible to reduce a total width of the five locking pieces 30 in the longitudinal direction so as to achieve a compact structure.

As mentioned above, this embodiment may be summarized as follows.

In this embodiment, the locking member has the five locking pieces 30 arranged along the longitudinal direction. Each of the five locking pieces 30 has the same width L4 in the longitudinal direction. The latch portions include the two or more first latch portions 13 each having a hole formed such that an opening width L1 thereof in the longitudinal direction is equal to the width L4 of each of the locking pieces 30, and the two or more second latch portions each having a hole formed such that an opening width L2 thereof in the longitudinal direction is greater than the opening width L1 of each of the holes of the first latch portions 13. The first latch portions 13 and the second latch portions 14 are alternately arranged along the longitudinal direction. Each of the holes of the first latch portions 13 is formed to allow one of the locking pieces 30 to be releasably inserted thereinto. The opening width L2 of each of the holes of the second latch portions 14 has a dimension allowing at least two of the locking pieces to be inserted together thereinto.

In the above the slide locking mechanism, for example, when the upper rail 2 is moved in the longitudinal direction relative to the lower rail. 1 according to a movement of the seat, and then stopped at an appropriate position, at least one of the five locking pieces 30 is inserted into the hole of one of the second latch portions 14. In this manner, even if the seat is quickly moved, at least one of the locking pieces 30 is inserted into the hole of one of the second latch portions 14, and the inserted locking piece 30 is brought into contact with and latched by the front inner wall region 15 or the rear inner wall region 16 of the corresponding second latch portion 14. This makes it possible to suppress the undesirable situation where the locking member passes over the appropriate position of the bottom wall 11 of the lower rail 1.

Then, when the seat is slightly moved from the above state in which the locking piece 30 is inserted into one of the second latch portions 14, one of the remaining locking pieces 30 is reliably inserted into one of the first latch portions 13. In this state, a play between the inserted locking piece 30 and the front and rear inner wall regions 15, 16 of the corresponding first latch portion 13 can be almost eliminated, because the opening width L1 of each of the holes of the first latch portions 13 is set to be equal to the width L4 of each of the locking pieces 30. Thus, the slide locking mechanism can minimize a play between the inserted locking piece 13 and the corresponding first latch portion 13, with such a simple structure, while facilitation a reduction in cost.

In this embodiment, the opening width L2 of each of the holes of the second latch portions 14 is set to be two times greater than the opening width L1 of each of the holes of the first latch portions 13.

According to this feature, in the locked state, one of the locking pieces 30 is inserted into the hole of one of the first latch portions 13 and two of the remaining locking pieces 30 are inserted into the hole of one of the second latch portions 14, or one of the locking pieces 30 is inserted into the hole of one of the first latch portions 13 and two of the remaining locking pieces 30 are inserted into respective ones of the holes of the two second latch portions 14 on front and rear sides of the corresponding first latch portion 13.

Thus, even if the upper rail 2 is urged to be moved in the longitudinal direction relative to the lower rail 1, the locking piece 30 inserted into the hole of one of the first latch portions 13 is brought into contact with and latched by the front inner wall region 15 or the rear inner wall region 16 of the hole of the corresponding first latch portion 13, and one of the two locking pieces 30 inserted into the hole(s) of one(s) of the second latch portion(s) 14 is brought into contact with and latched by the front inner wall region 15 or the rear inner wall region 16 of the hole(s) of the corresponding second latch portion(s) 14.

Thus, in the locked state, a force applied to the lower rail 1 and the upper rail 2 can be distributed to and received by two portions in the above manner.

In this embodiment, a distance in the longitudinal direction between adjacent ones of the first and second latch portions 13, 14 is equal to the width L4 of each of the locking pieces 30, and the at least five locking pieces 30 are arranged without a gap with respect to each other in the longitudinal direction.

According to this feature, a force which may otherwise be imposed on a part of the locking pieces 30 can be received by the five locking pieces 30, i.e., by the entire locking member.

In this embodiment, the locking pieces 30 are formed and arranged as follows. When one of the locking pieces 30 is inserted into the hole of one of the first latch portions 13, the inserted locking piece 30 is brought into contact with (preferably surface contact with) an inner wall of the hole of the corresponding first latch portion 13, in front and rear regions 15, 16 of the inner wall in the longitudinal direction. Further, when two of the locking pieces 30 are inserted into the hole of one of the second latch portions 14, a front one of the at least two locking pieces 30 in the longitudinal direction is brought into contact with (preferably surface contact with) an inner wall of the hole of the corresponding second latch portion 14, in a front region 15 of the inner wall in the longitudinal direction, and a rear one of the at least two locking pieces in the longitudinal direction is brought into contact with (preferably surface contact with) the inner wall of the hole of the corresponding second latch portion 14, in a rear region 16 of the inner wall in the longitudinal direction.

According to this feature, the three locking pieces 30 are in contact with the two front inner wall regions 15 and the two rear inner wall regions 16 which are located in opposed relation to each other in the longitudinal direction, so that a force imposed on the locking pieces 30 and the inner wall regions 15, 16 can be suppressed from concentrating. This makes it possible to provide enhanced durability of the locking pieces 30 and the latch portions 13, 14.

Although the locking member in the above embodiment is comprised of five locking pieces 30, the present invention is not limited thereto, but the locking member may be comprised of six or more locking pieces 30.

In the above embodiment, each of the locking pieces 30 is formed as a rectangular parallelepiped-shaped plate. Alternatively, each of the locking pieces 30 may be formed in any other suitable shape, such as a columnar shape. However, in the case where each of the locking pieces 30 is formed as a rectangular parallelepiped-shaped plate, each of the locking pieces 30 can be engaged with a respective one of the latch portions 13, 14 in a surface contact manner to allow the latch portions 13, 14 to become less likely to be deformed.

The above embodiment has been described based on one example where the hole of each of the first and second latch portions 13, 14 is a through-hole (penetrated hole). Alternatively, the hole may be a non-penetrated hole, such as a concave portion or depressed portion.

Although the above embodiment has been described based on one example where the opening width L1 of each of the holes of the first latch portions 13 is equal to the width L4 of each of the locking pieces 30, and the opening width L2 of the second latch portions 14 is two times greater than two times greater than the width L4 of each of the locking pieces 30, the present invention is not limited thereto.

For example, the opening width of each of the holes of the first and second latch portions 13, 14 in the longitudinal direction may be set to be two times greater than the width of each of the locking pieces 30 in the longitudinal direction, and the distance between adjacent ones of the first and second latch portions 13, 14 in the longitudinal direction may be set to be equal to the width of each of the locking pieces 30. In this case, the locking member may be comprised of at least three locking pieces 30, whereby one of the at least three locking pieces 30 can be inserted into the hole of one of the first latch portions 13 or the hole of one of the second latch portions 14, even if the locking members are set at any position of the bottom wall 11 of the lower rail 1. In addition, when the locking member is moved in the frontward-rearward direction until the inserted locking piece 30 is brought into contact with the inner wall of the corresponding first latch portion 13 or the corresponding second latch portion 14, a remaining one of the at least three locking pieces 30 is inserted into one of the remaining ones of the first and second latch portions 13, 14 to achieve a state free from the play.

Although the above embodiment has been described based on one example where the opening width L2 of each of the holes of the second latch portions 14 is two times greater than the width L4 of each of the locking pieces 30, so that adjacent two of the locking pieces 30 can be inserted into one of the holes of the second latch portions 14, the present invention is not limited thereto. For example, in case where the locking member is comprised n locking pieces 30, the opening width of each of the holes of the second latch portions 14 may be in the range of two times to n times as large as the width of each of the locking pieces 30 in the longitudinal direction.

However, if the opening width of each of the holes of the second latch portions 14 becomes greater than two times as large as the width of each of the locking pieces 30, the adjacent locking pieces 30 can be in contact with only one of the front inner wall region 15 and the rear inner wall region 16 of one of the latch portions 13, 14, in the locked state.

Thus, it is preferable that the opening width of each of the holes of the second latch portions 14 is set to be two times greater than the width of each of the locking pieces 30, so that adjacent two of the locking pieces 30 can be inserted into one of the holes of the second latch portions 14, while allowing the adjacent two of the locking pieces 30 to be in contact with both the front inner wall region 15 and the rear inner wall region 16 of one of the latch portions 13, 14, in the locked state, as in the above embodiment.

In the above embodiment, the five locking pieces 30 are arranged such that adjacent ones thereof are in contact with each other without forming a gap therebetween. Alternatively, the five locking pieces 30 may be arranged to form a given gap between adjacent ones thereof.

However, the arrangement devoid of the gap allows a force which may otherwise be imposed on a part of the locking pieces 30 to receive the entire locking member. Thus, the five locking pieces 30 are preferably arranged such that almost no gap is formed between the adjacent ones thereof.

Although the locking pieces 30 and the latch portions 13, 14 in the above embodiment are arranged in one line along the longitudinal direction, the present invention is not limited thereto. For example, the latch portions 13, 14 may be arranged to form a plurality of lines in a widthwise direction of the lower rail 1, and the locking pieces 30 may be arranged to form a plurality lines each corresponding to a respective one of the lines of the latch portions 13, 14.

Although the locking member in the above embodiment is comprised of a single locking-piece group consisting of five locking pieces 30, the present invention is not limited thereto. For example, the locking member may be comprised of a plurality of locking-piece groups each consisting of five or more locking pieces 30. In this case, the plurality of locking-piece groups may be arranged along the frontward-rearward direction with a distance therebetween.

In the above embodiment, the latch portions 13, 14 are provided in the lower rail 1, and the locking pieces 30 are held by the upper rail 2. Alternatively, the latch portions 13, 14 may be provided in the upper rail 2, and the locking pieces 30 may be held by the lower rail 1.

Although each of the lower rail 1 and the upper rail 2 in the above embodiment is arranged such that the longitudinal direction thereof is oriented along the frontward-rearward direction of the automobile to allow the seat to be moved in the frontward-rearward direction, the present invention is not limited thereto.

For example, each of the lower rail 1 and the upper rail 2 may be arranged such that the longitudinal direction thereof is oriented along a rightward-leftward direction of the automobile to allow the seat to be moved in the rightward-leftward direction. Alternatively, each of the lower rail 1 and the upper rail 2 may be arranged such that the longitudinal direction thereof is oriented to extend in an arc shape having a center on a vertical axis to allow the seat to be rotatably moved around the vertical axis. Alternatively, each of the lower rail 1 and the upper rail 2 may be arranged such that the longitudinal direction thereof is oriented to extend in an arc shape having a center on a horizontal axis to allow the seat to be rotatably moved around the horizontal axis. In these cases, the movement of the seat is appropriately locked using the slide locking mechanism of the present invention.

This application is based on Japanese Patent Application Serial No. 2008-273325 filed in Japan Patent Office on Oct. 23, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A slide locking mechanism for a seat, comprising:
    an elongate lower rail fixed to a vehicle body and extending in a longitudinal direction;
    an elongate upper rail fixed to the seat and extending in the longitudinal direction;
    a locking member held by a first of the rails, the locking member having at least five locking pieces arranged along the longitudinal direction without gaps between the locking pieces in the longitudinal direction, the locking pieces having equal widths in the longitudinal direction and each of the locking pieces being movable independently of the other locking pieces; and
    a plurality of first latch holes and a plurality of second latch holes arranged alternately in a second of the rails at spaced apart positions along the longitudinal direction so that a distance in the longitudinal direction between adjacent ones of the latch holes is equal to the width of each of the locking pieces, each of the first latch holes having an opening width in the longitudinal direction that is equal to the width of each of the locking pieces so that a first of the locking pieces can be inserted releasably therein, each of the second latch holes having an opening width in the longitudinal direction that is twice the opening width of each of the first latch holes so that a second and a third of locking pieces simultaneously can be inserted releasably in one of the second latch holes while the first of the locking pieces is inserted releasably in one of the first latch holes for substantially preventing play between the upper and lower rails and distributing locking forces in both directions parallel to the upper and lower rails.

2. The slide locking mechanism as defined in claim 1, wherein the locking pieces are formed and arranged such that:
    in a state that the first locking pieces is inserted into one of the first latch holes, the first locking piece is brought into contact with an inner wall of the respective first latch hole in two regions of the inner wall located in opposed relation to each other in the longitudinal direction; and
    in a state that the second and third locking pieces are simultaneously inserted into one of the second latch holes, the second locking piece is brought into contact with one of an inner wall of the respective second latch hole in one of two regions of the inner wall located in opposed relation to each other in the longitudinal direction, and the third locking piece is brought into contact with the inner wall of the respective second latch hole in the other of the two regions of the inner wall of the inner wall located in opposed relation to each other in the longitudinal direction.

3. The slide locking mechanism as defined in claim 1, further comprising biasing members biasing each of the locking pieces toward the latch holes in the second of the rails.

4. The slide locking mechanism as defined in claim 1, further comprising a lock release member adapted to move the locking pieces from a latch position where at least one of the locking pieces is in at least one of the latch holes to a release position where none of the locking pieces are in any of the latch holes.

* * * * *